(No Model.)
A. C. TAYLOR.
VINEYARD PLOW.
No. 255,898. Patented Apr. 4, 1882.
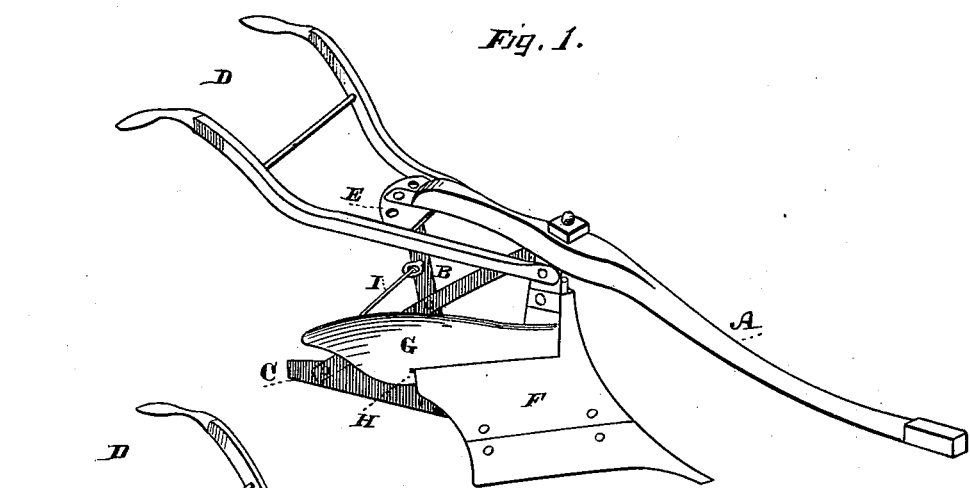
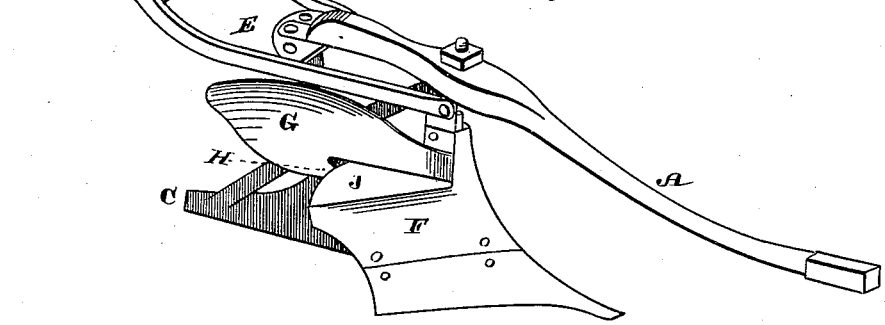
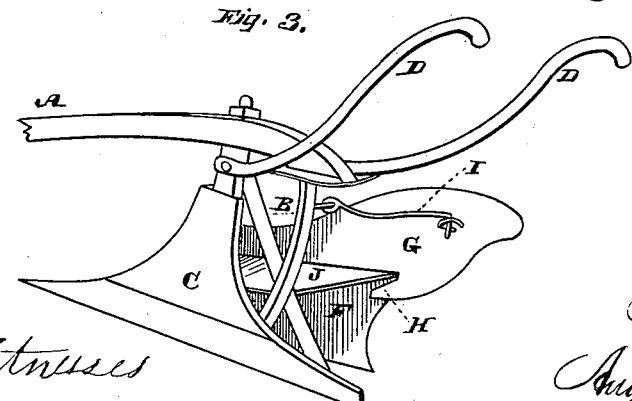
Witnesses
Geo. H. Strong.
Frank A. Brooks.
Inventor
Augustus C. Taylor
By Dewey & Co.
Attys
N. PETERS. Photo-Lithographer, Washington, D. C.

UNITED STATES PATENT OFFICE.

AUGUSTUS C. TAYLOR, OF SAN FRANCISCO, CALIFORNIA.

VINEYARD-PLOW.

SPECIFICATION forming part of Letters Patent No. 255,898, dated April 4, 1882.

Application filed December 19, 1881. (No model.)

*To all whom it may concern:*

Be it known that I, AUGUSTUS C. TAYLOR, of the city and county of San Francisco, State of California, have invented a Vineyard-Plow; and I hereby declare the following to be a full, clear, and exact description thereof.

My invention relates to certain improvements in plows, these improvements being especially applicable to what are known as "vineyard-plows."

My improvement consists in the combination of a plow having the lower portion of the share and mold-board made stationary, while the upper portion is hinged in front, so that it may swing outward and stand in the same curve with the front of the mold-board, or it may swing back beneath the beam and not turn a furrow, but will allow the earth which has been lifted by the plow to fall back into the furrow again. The beam swings upon a vertical pivot, so as to throw the plow to or from the land in the ordinary manner.

In the accompanying drawings, Figures 1, 2, and 3 are views of my invention.

A is the beam of my plow. B is the standard, C the landside, and D the handles. The beam is centrally pivoted upon a stem or spindle, which projects upward from the top of the standard. This allows the beam to swing from side to side. A rack, E, beneath the rear end of the beam receives a pin, which passes through the rear end of the beam into holes in the rack, so as to hold the beam in such a position as to throw the plow more or less toward the land or the rows of vines.

The mold-board is composed of two parts. The part F, extending up from the plow point and share, is fixed to the landside. The upper portion, G, of the mold-board is hinged to a vertical pin at the front, so that it may swing about this pin. The outer edge of this portion G conforms in curvature with the stationary part F, and a lug or projection, H, extends beneath and behind the part F, so as to act as a stop to prevent the part G from swinging out too far. A hook-brace, I, or other suitable device from the upper rear part of the landside or its braces, serves to hold the part G in place when swung outward, so that it then forms a continuation of the mold-board, and will then turn the soil over and form a furrow in the usual manner. When, however, it is desired simply to loosen up the soil the brace or hook is unfastened, and the upper part, G, is allowed to swing back nearly or quite parallel with or beneath the beam. The lower part, F, of the mold-board has a flat top, J, so that when the plow is used with the part G swung back the earth passes up the side of the mold-board and over the top of this flat portion, so as to fall back into the same place without being turned over, but in a loosened and pulverized condition. This makes my plow especially useful for vineyards and similar places.

Having thus described my invention, what I claim as new, and desire to secure by Letters Patent, is—

The movable portion G of the mold-board, mounted on a vertical pivot and moving in a horizontal arc, in combination with the lower fixed portion, F, and brace I, all constructed, arranged, and operated as set forth.

In witness whereof I have hereunto set my hand.

AUGUSTUS C. TAYLOR.

Witnesses:
FRANK A. BROOKS,
S. H. NOURSE.